United States Patent [19]

Morel et al.

[11] Patent Number: 4,492,816

[45] Date of Patent: Jan. 8, 1985

[54] SPLICE-PROTECTING SLEEVE FOR ELECTRIC CABLES OR TELEPHONE CABLES

[75] Inventors: André Morel; Jacques Morel, both of Favieres, France

[73] Assignee: Etablissements Morel, Ateliers Electromecaniques de Favieres, Favieres, France

[21] Appl. No.: 503,582

[22] Filed: Jun. 13, 1983

[30] Foreign Application Priority Data

Jun. 30, 1982 [FR] France ............................. 82 11467
Feb. 18, 1983 [FR] France ............................. 83 02641

[51] Int. Cl.³ ..................... H02G 15/18; H02G 15/113
[52] U.S. Cl. ........................................ 174/92; 174/77 R
[58] Field of Search ................... 174/76, 77 R, 92, 93

[56] References Cited

U.S. PATENT DOCUMENTS

| | | | |
|---|---|---|---|
| 2,771,502 | 11/1956 | King et al. ............................. | 174/92 |
| 2,788,385 | 4/1957 | Doering et al. .................. | 174/77 R |
| 3,636,241 | 1/1972 | Baumgartner et al. ............... | 174/92 |
| 3,711,632 | 1/1973 | Ghirardi ........................... | 174/92 X |
| 3,715,459 | 2/1973 | Hoffman .......................... | 174/92 X |
| 3,796,823 | 3/1974 | Wright et al. ................ | 174/77 R X |
| 4,387,268 | 6/1983 | Morel et al. .......................... | 174/92 |

FOREIGN PATENT DOCUMENTS

| | | | |
|---|---|---|---|
| 2652803 | 6/1978 | Fed. Rep. of Germany ........ | 174/92 |
| 2457585 | 1/1981 | France ................................. | 174/92 |
| 29148 | 6/1967 | Japan .................................... | 174/92 |
| WO81/01487 | 7/1983 | PCT Int'l Appl. . | |

Primary Examiner—John F. Gonzales
Assistant Examiner—Morris H. Nimmo
Attorney, Agent, or Firm—Young & Thompson

[57] ABSTRACT

A sleeve for protecting cable splices against environmental moisture and aggressive fluids comprises two half-shells having flanges which are placed against each other in the assembled position. In this position, the adjacent flanges define a duct into which sealing material in the form of paste is introduced. The opposite ends of the sleeve are provided with jaws which are clamped against the cable at the time of assembly of the two half-shells. Two jaws define between them a chamber which communicates with the sealing duct by means of a channel formed around the entire periphery of a jaw which is adjacent to the chamber, the channel being located at the bottom of the recess in which the jaw is fitted.

19 Claims, 20 Drawing Figures

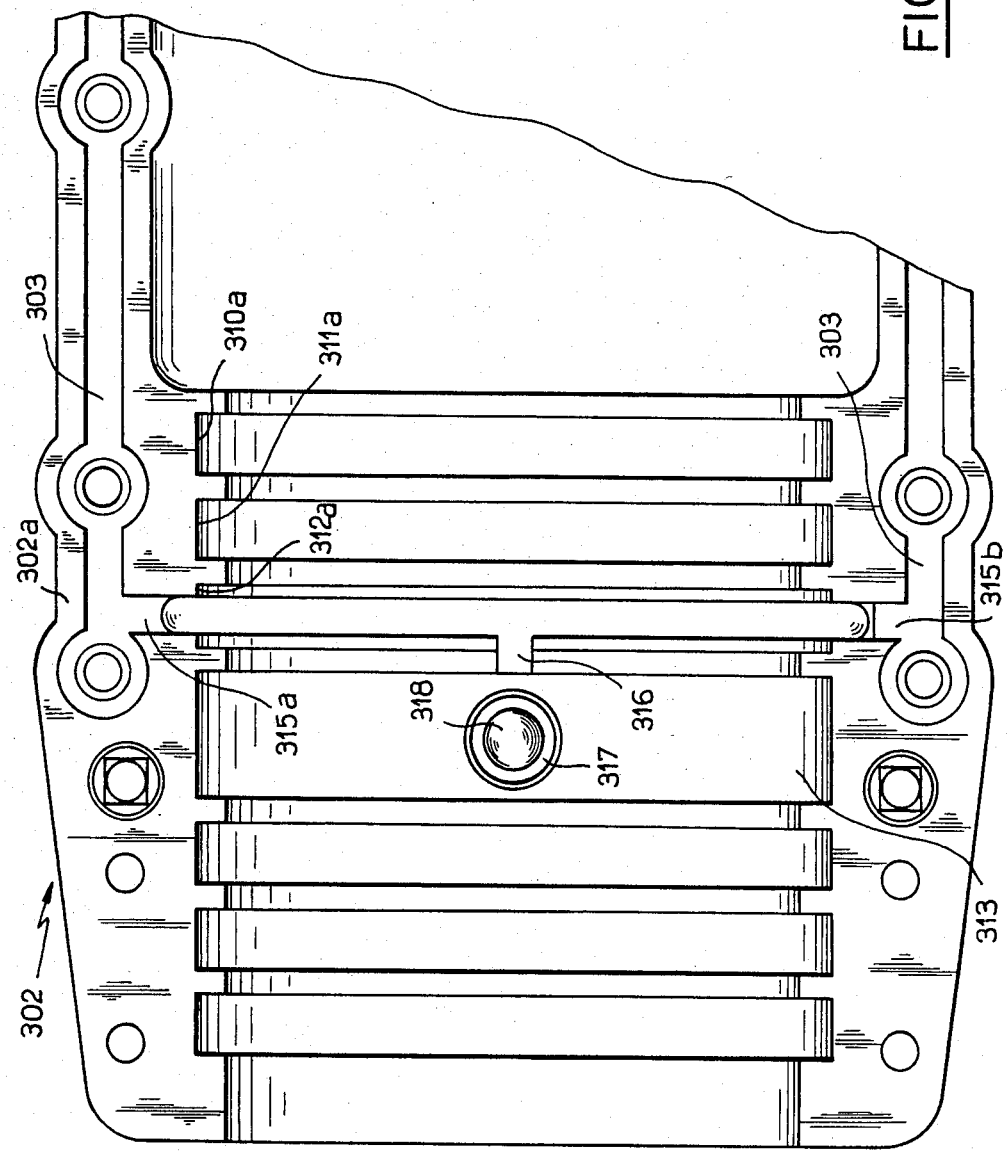
FIG_1

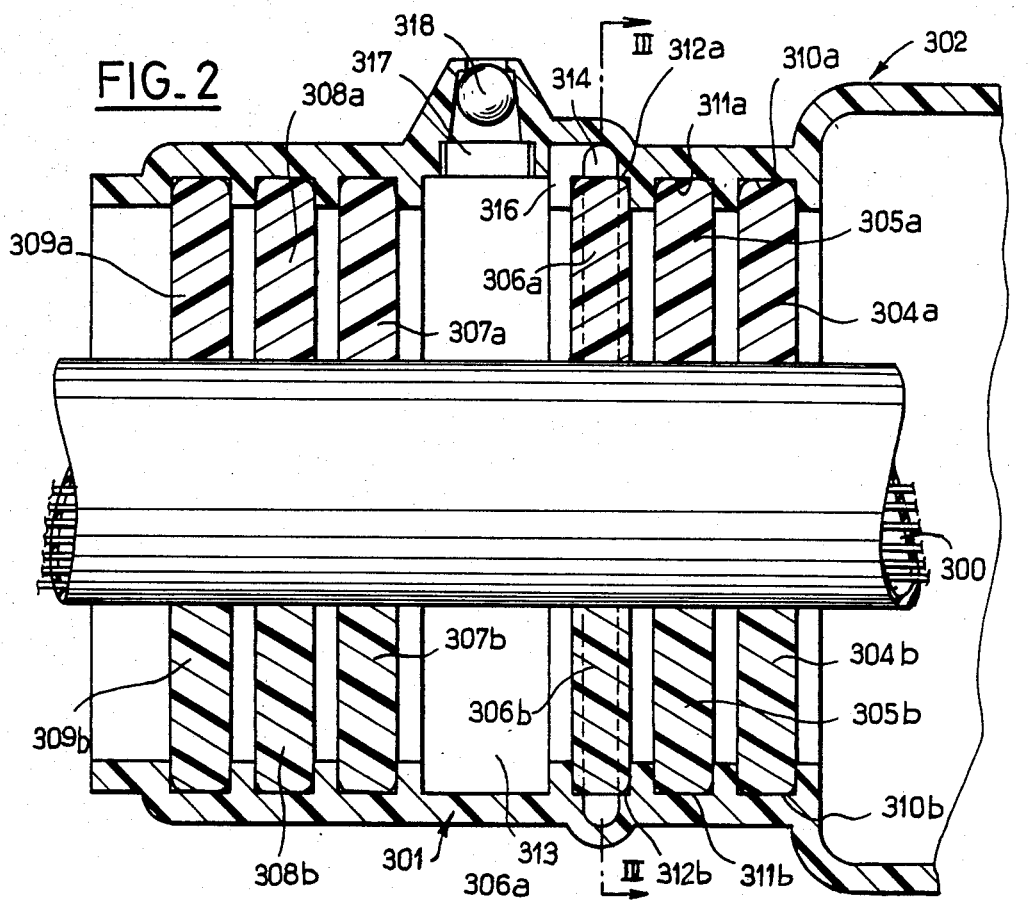
FIG_2
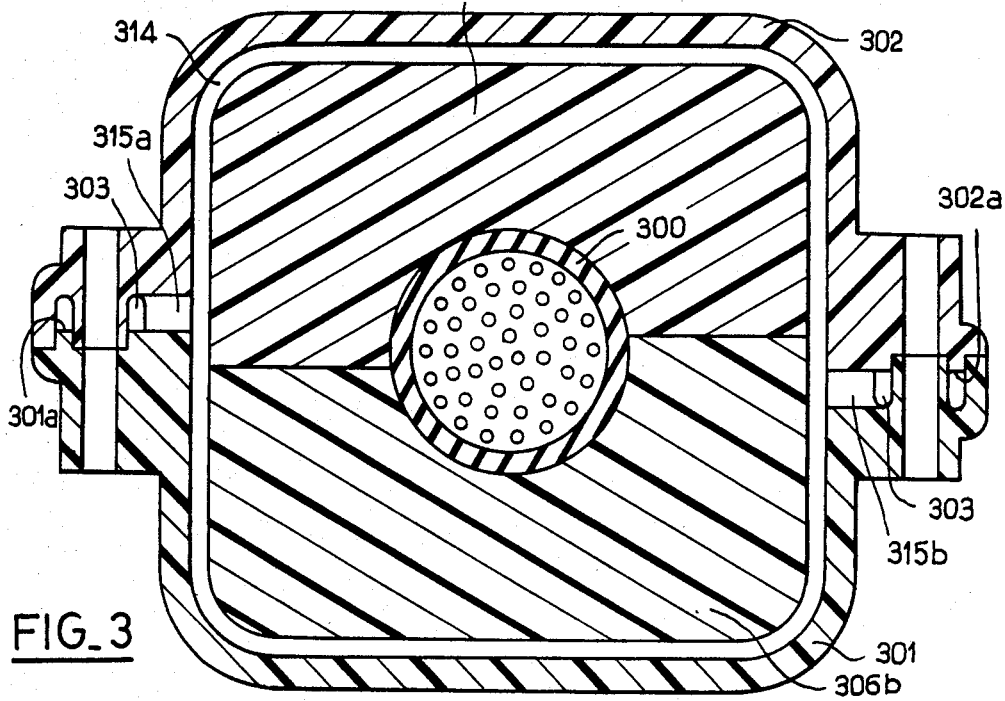
FIG_3

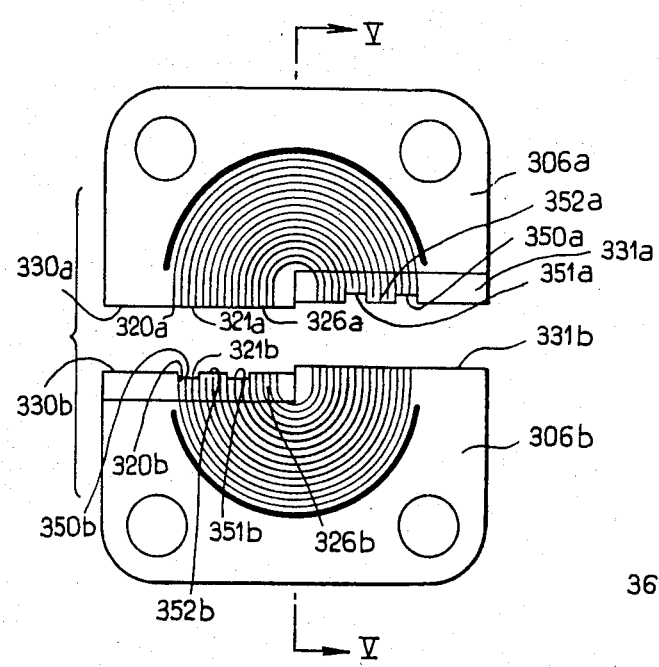
FIG.4
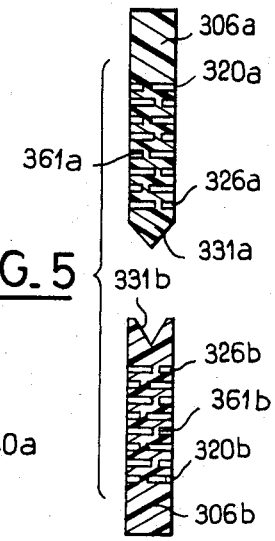
FIG.5
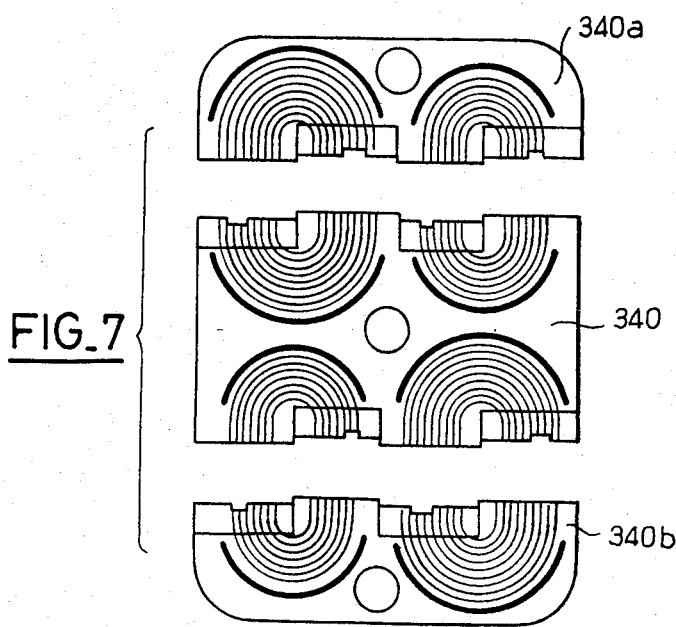
FIG.7
FIG.6

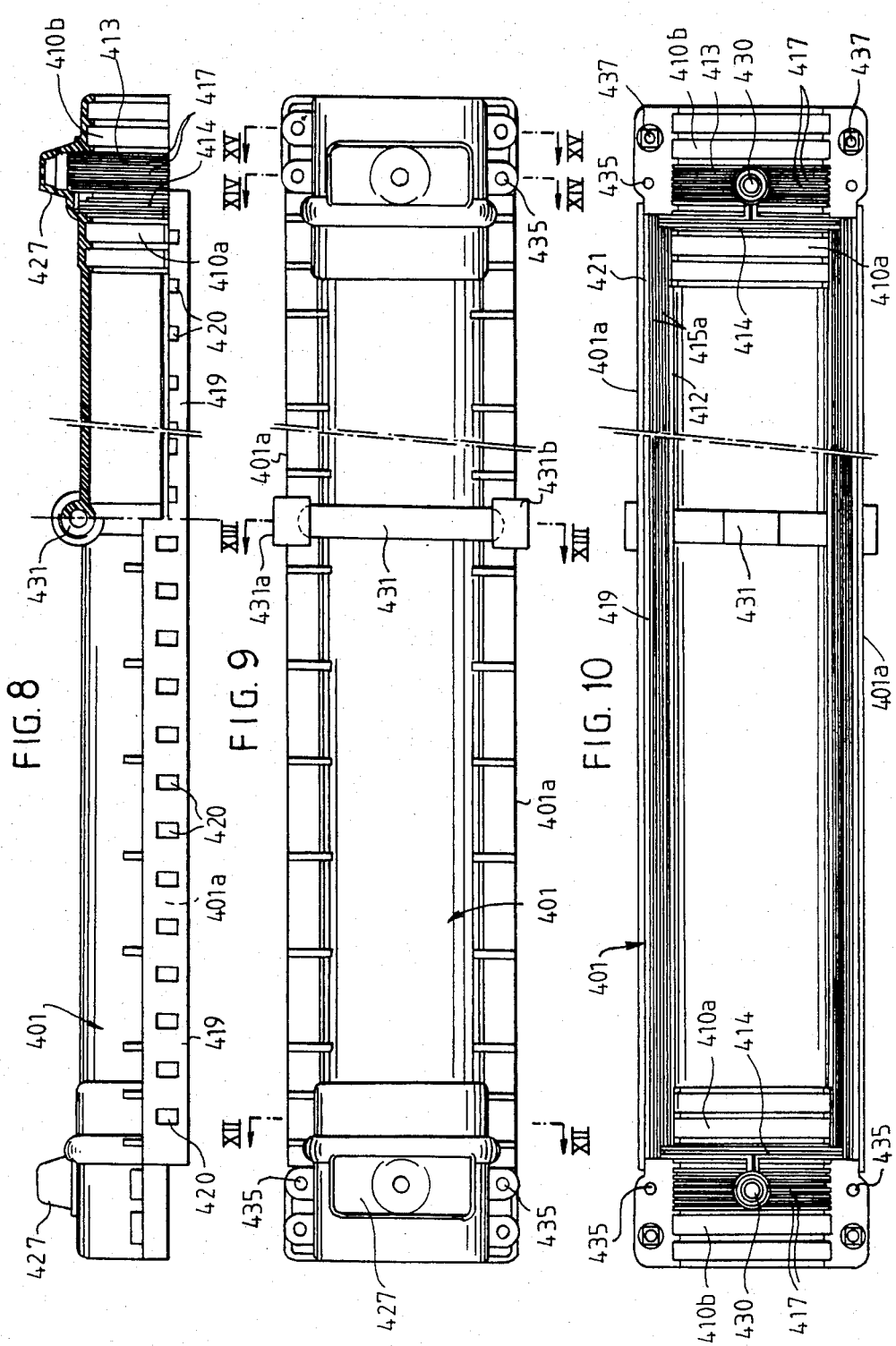

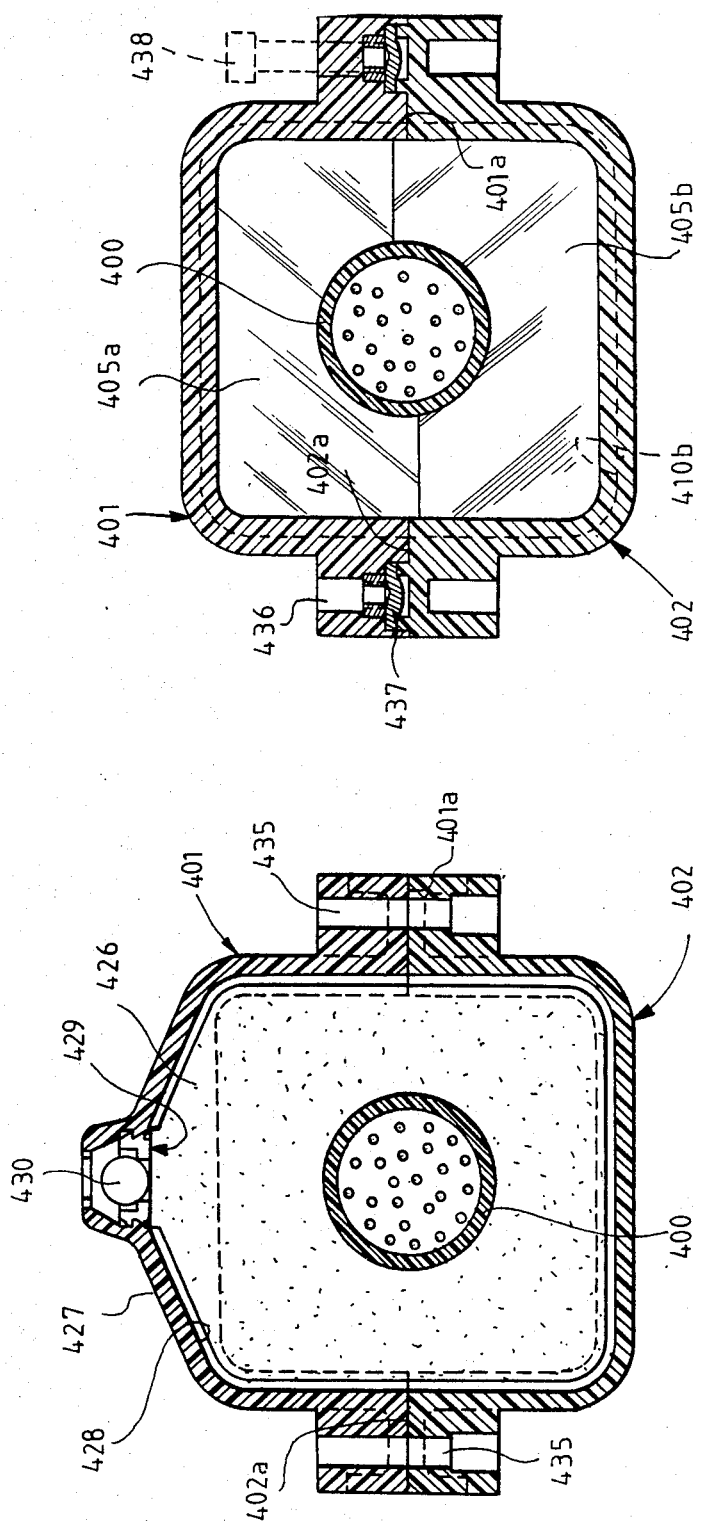

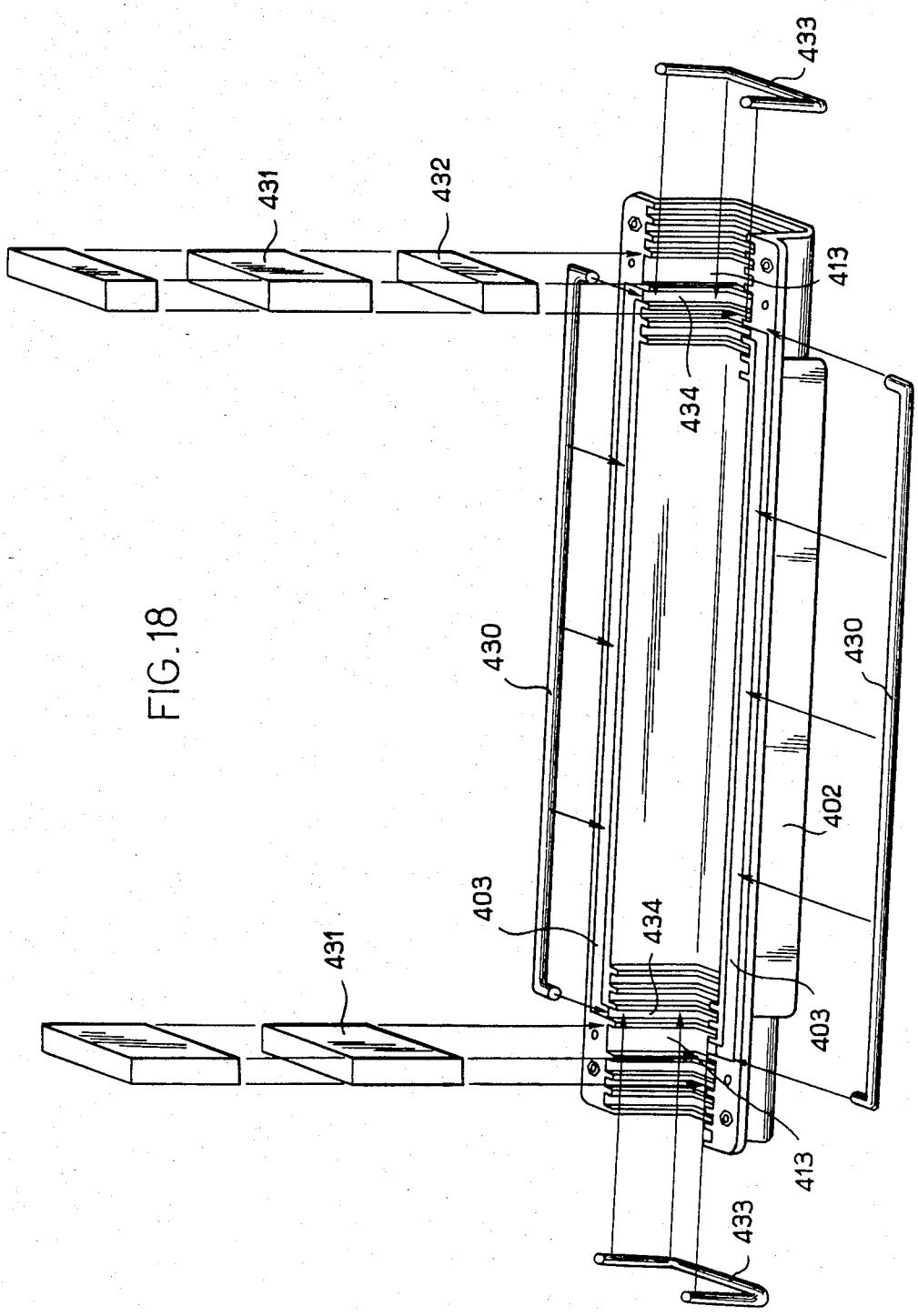

SPLICE-PROTECTING SLEEVE FOR ELECTRIC CABLES OR TELEPHONE CABLES

The present invention relates to a splice-protecting sleeve of plastic material for electric cables or telephone cables.

There was described in U.S. Pat. No. 4,387,268 a sleeve for protecting spliced joints of electric cables or telephone cables. In this design, the sleeve is constituted by two half-shells assembled together around the splice by means of their adjacent flanges, a channel being formed in said adjacent flanges in order to define a passage or duct in the assembled position. Means are provided for injecting into said duct a substance in paste form for ensuring fluid-tightness between said adjacent flanges.

Moreover, the opposite ends of the sleeve are provided with jaws which are intended to be clamped against the cable at the time of assembly of the two half-shells. At least two of said jaws define between them a chamber which communicates with the duct mentioned above.

When sealing material such as a polymerizable resin is injected into said duct, said material penetrates into the chamber which is formed between the two jaws and annularly surrounds the ends of the cables which are clamped in position by said jaws. The sealing material thus achieves excellent fluid-tightness of the sleeve, both at the level of the assembled longitudinal flanges of the two half-shells of the sleeve and at the level of the jaws.

The object of the present invention is to achieve an even higher standard of fluid-tightness.

In accordance with the invention, said protective sleeve is distinguished by the fact that the aforesaid chamber communicates with the duct by means of a channel formed around the entire periphery of a jaw which is adjacent to said chamber, said channel being located at the bottom of the recess in which said jaw is fitted.

When the sealing material is injected into the duct formed between the assembled flanges of the two half-shells of the sleeve, said material penetrates into the channel formed around the entire periphery of the jaw aforesaid and then fills the chamber.

A veritable sealing joint is thus formed around the jaw and serves to enhance the fluid-tightness obtained by means of the chamber which is adjacent to said jaw and is filled with sealing material.

As described in the first certificate of Addition related to the U.S. patent cited earlier, each cable-clamping jaw comprises two jaw elements engaged in interfitting relation around the cable, each jaw element being provided with a series of grooves extending in circular arcs whose radii are adapted to different cable diameters.

In accordance with the present invention, the flange of one of the jaw elements which is intended to be engaged in the adjacent flange of the other jaw element preferably comprises two rectilinear portions of equal length which are provided in one case with a convex profile and in the other case with a concave profile and which are intended to receive respectively the concave profile and the convex profile of the corresponding portions of the flange of the other jaw element.

Said convex and concave profiles make it possible to ensure a high standard of fluid-tightness between the adjacent flanges of the jaw elements which are clamped around the cable.

In the embodiment described in U.S. Pat. No. 4,387,268, the duct formed between the adjacent flanges of the half-shells of the sleeve and the chamber located between the jaws has a smooth internal surface to which the sealing resin does not always adhere to a sufficient extent.

After assembly of the half-shells, air under pressure is introduced into the interior of the sleeve in order to prevent any moisture or any aggressive fluid from penetrating into the sleeve.

By reason of this overpressure of air which may exceed 1 bar, and in order to guard against any leakage to the exterior, it is necessary to assemble the flanges of the half-shells by means of a large number of clamping screws.

Positioning of these clamping screws is a time-consuming operation, with the result that the assembly of the sleeves entails high capital cost.

In order to overcome this disadvantage, and in accordance with a preferred embodiment of the invention, the adjacent flanges of the half-shells of the sleeve as well as the chamber are provided with raised portions separated by recessed portions which are intended to be filled with the sealing material in the form of paste.

Said raised portions and recessed portions consequently increase the contact surface area between the sealing material, the internal surface of the duct and of the chamber, thereby achieving considerably stronger adhesion of the sealing material to said surfaces. Said sealing material thus makes it possible to obtain a sufficiently strong bond between the assembled portions of the sleeve, with the result that it is possible to limit the number of clamping screws of the two half-shells and thus to reduce the cost of assembly.

Other features of the invention will be more apparent upon consideration of the following description and accompanying drawings, wherein:

FIG. 1 is a plan view showing the interior of the end portion of a half-shell of a sleeve in accordance with the invention;

FIG. 2 is a longitudinal sectional view of a sleeve in accordance with the invention and showing the jaws clamped around the cable;

FIG. 3 is a sectional view taken along the plane III—III of FIG. 2;

FIG. 4 is a plan view of the two elements of a jaw employed in the sleeve in accordance with the invention;

FIG. 5 is a sectional view taken along the plane V—V of FIG. 4;

FIG. 6 is a plan view of a graduated rule employed at the time of assembly of the jaws and of the cable within the sleeve in accordance with the invention;

FIG. 7 is a plan view of the elements of a jaw which are adapted to provide passageways for four cables;

FIG. 8 is a side view with a partial longitudinal cross-section of a half-shell and showing another sleeve in accordance with the invention;

FIG. 9 is a top view of said half-shell;

FIG. 10 is a bottom view of said half-shell;

FIG. 14 is a sectional view of the two assembled half-shells, this view being taken along the plane XIV—XIV of FIG. 9;

FIG. 15 is a sectional view of the two assembled half-shells, this view being taken along the plane XV—XV of FIG. 9;

FIG. 18 is an exploded view in perspective of a half-shell and showing another embodiment of the sealing system;

Figure 11:
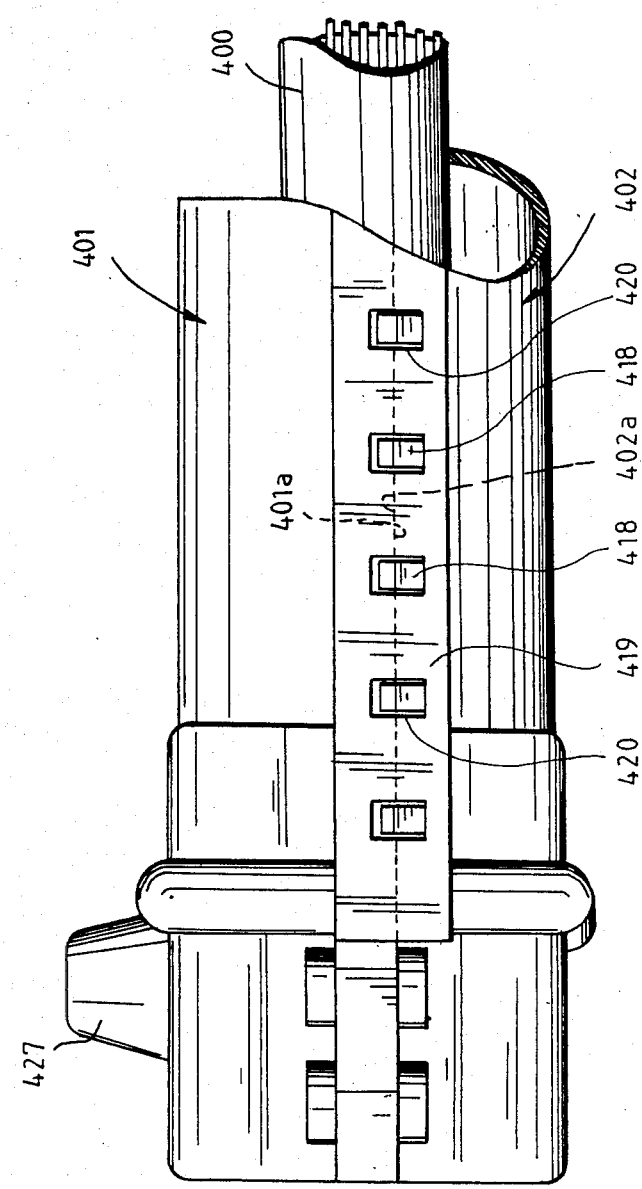
FIG. 11 is a fragmentary side view showing the two assembled half-shells of the sleeve.

In the embodiment of FIGS. 1 to 3, the sleeve for protecting the splice of a cable 300 comprises two half-shells 301, 302 having longitudinal flanges 301a, 302a. There is formed in each flange a channel which defines a duct 303 in the assembled position of said flanges. Said duct is intended to be filled with material in paste form in order to establish a fluid-tight seal between said flanges 301a, 302a.

As shown in FIG. 2, the cable 300 is secured axially to each end of the sleeve by means of clamping jaws each constituted by two jaw elements 304a, 304b, 305a, 305b, 306a, 306b, 307a, 307b, 308a, 308b, 309a, 309b, fitted within recesses 310a, 310b, 311a, 311b, 312a, 312b, and so on, which are formed in the half-shells 301, 302.

It is also apparent from FIG. 2 that the jaws 306a, 306b and 307a, 307b define between them a chamber 313, said chamber being intended to be filled with sealing material which is injected into the duct 303 formed between the longitudinal flanges of the half-shells 301, 302.

Said chamber 313 communicates with the duct 303 by means of a channel 314 (as shown in FIGS. 2 and 3) formed around the entire periphery of the jaw 306a, 306b which is adjacent to the chamber 313. Said channel 314 is formed at the bottom of the recesses 312a, 312b within which the jaw elements 306a, 306b are fitted.

It can be seen in FIGS. 1 and 3 that said channel 314 communicates with the duct 303 defined between the adjacent flanges of the half-shells 301, 302 via two passages 315a, 315b which are transverse to the duct 303. Said passages are formed in the opposite flanges 301a, 302b of the half-shells and located opposite to the recess 312a, 312b in which the jaw 306a, 306b is fitted.

Furthermore, the channel 314 communicates with the chamber 313 by means of a passage 316 which is oriented along the axis of the sleeve and opens into the recess 312a of the jaw element 306a.

The chamber 313 is provided with an orifice 317 which is formed in the half-shell 302 and opens to the exterior of the sleeve. A ball 318 which performs the function of a valve is housed within said orifice 317.

At the time of injection of sealing material into the duct 303 formed between the longitudinal coupling flanges of the half-shells 301, 302, said sealing material penetrates first of all into the channel 314 via the lateral passages 315a, 315b, then fills the chamber 313 via the passage 316.

The sealing material thus forms a veritable fluid-tight joint around the jaw elements 306a, 306b, thus enhancing the fluid-tightness achieved downstream of said jaw elements by the sealing material which fills the chamber 313.

There is consequently obtained a double guarantee of imperviousness to the penetration of moisture into the ends of the sleeve.

The transparent ball 318 housed within the orifice 317 first allows the air to escape to the exterior of the sleeve. Then, when the desired filling pressure is attained, said ball closes the orifice 317 in fluid-tight manner. The fact that said ball 318 is transparent enables the operator to check the filling of the chamber 313 by visual inspection.

As shown in FIGS. 4 and 5, the jaw elements 306a and 306b are provided with a series of grooves 320a, 321a . . . 326a; 320b, 321b . . . 326b which extend in concentric circular arcs adapted to different cable diameters. Said grooves facilitate the cutting-out of notches which have the shape of a circular arc and are intended to be applied around the cable.

In accordance with the present invention, the edge of one of the jaw elements 306a which is intended to be fitted in the adjacent edge of the other jaw element 306b has two rectilinear portions of equal length. One portion 330a has a concave profile whilst the other rectilinear portion 331a has a convex profile, said portions being intended to receive respectively the convex profile 330b and the concave profile 331b of the corresponding portions of the edge of the other jaw element.

In the example illustrated in FIGS. 4 and 5, the convex profile 331a, 330b is defined by an outwardly projecting dihedron of the jaw element whereas the concave profile 330a, 331b is defined by a complementary inwardly projecting dihedron.

These profiles serve to ensure in the coupling position a high standard of fluid-tightness between the adjacent edges of the jaw elements 306a, 306b.

At the time of positioning of the cable 300 within the interior of the sleeve, the jaw elements 306a, 306b are cut-out along an arcuate groove 320a . . . 326a; 320b . . . 326b having a radius corresponding to that of the cable.

In order to improve the fluid-tightness between the adjacent edges of the jaw elements 306a, 306b, it is an advantage to apply against said edges a coating compound such as a silicone putty which is compatible with the plastic material of the jaw elements 306a, 306b and with the sealing material which is intended to fill the channel 314 and the chamber 313.

In accordance with a further advantageous feature of the present invention, the adjacent edges of the jaw elements 306a, 306b are provided with transverse notches 350a, . . . 351a; 350b, . . . 351b which are separated by projecting portions or lugs 352a, 352b having the same width as the notches. The opposite edges of said notches 350a . . . 351b are located in the line of extension of two arcuate cutting-out grooves which are separated by one or a number of other grooves.

Said notches 350a or lugs 352a facilitate the location of the arcuate groove to be cut-out as a function of the diameter of the cable.

In order to measure the diameter of a cable which is intended to be protected by means of the sleeve in accordance with the invention, use is advantageously made of a graduated rule 360 of transparent and flexible plastic material as illustrated in FIG. 6.

Said graduated rule has a reference mark $M_1$ or $M_2$ (depending on the type of jaw) and two-digit numerals 11, 12, 13, 21, 22, 23 . . . The first digit indicates the number of the notch 350a or of the lug 352a of the jaw elements 306a, 306b and the second digit indicates the number of the arcuate groove 320a . . . 326a or 320b . . . 326b of the notch or lug considered.

Said flexible rule 360 is rolled around the cable and the number is read opposite to the reference mark $M_1$ or $M_2$. The read number (21, for example) means that the arcuate groove to be cut is the first groove of the second notch or lug.

The notches such as 350a and lugs such as 352a combined with the flexible rule 360 therefore facilitate location of the arcuate grooves to be cut and limit the risks of errors which could result in deficient fluid-tightness between the jaws and the cable.

As can readily be understood, the present invention is not limited to the examples which have just been described and a large number of modifications can accordingly be contemplated without thereby departing either from the scope or the spirit of the invention.

Thus the arrangements mentioned above can also be applied to the case of a jaw adapted to the passage of a plurality of cables as shown by way of example in FIG. 7. This jaw is composed of a central element 340 and of two end elements 340a, 340b. The element 340a defines two cable passages with the central element 340 and the other element 340b defines two other cable passages with the central element 340.

Furthermore, as indicated in FIG. 5, it is an advantage to ensure that the partition-walls 361a, 361b which define the bottom ends of the grooves 320a, . . . 326a; 320b, . . . 326b are located at a distance from the opposite faces of the jaw elements 306a, 306b which is successively short and long with respect to one of said faces.

In fact, this arrangement of the partition-walls 361a, 361b endows the jaw elements 306a, 306b with better radial deformability when said elements are clamped against the cable 300. This in turn makes it possible to obtain excellent fluid-tightness between said jaw elements and the cable even when the cross-section of this latter is not perfectly circular.

Figure 12:
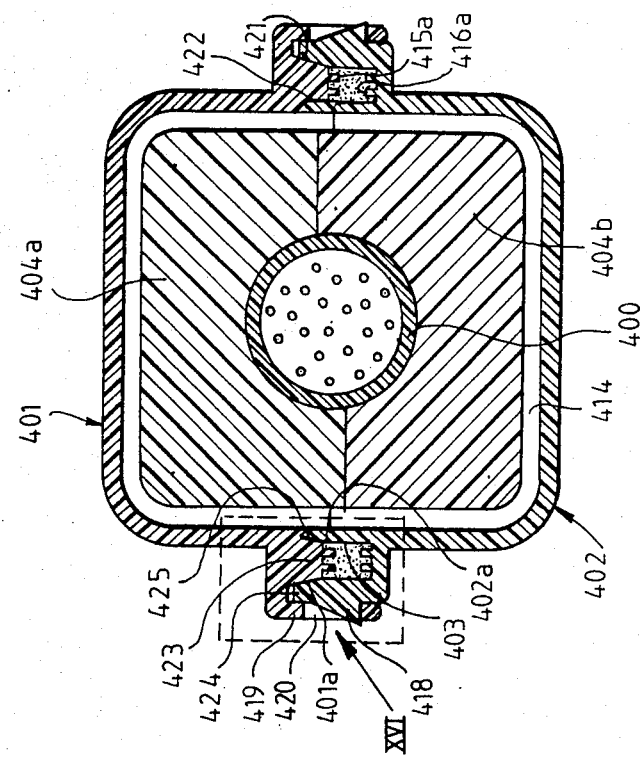
FIG. 12 is a sectional view of the two assembled half-shells, this view being taken along the plane XII—XII of FIG. 9.
Figure 13:
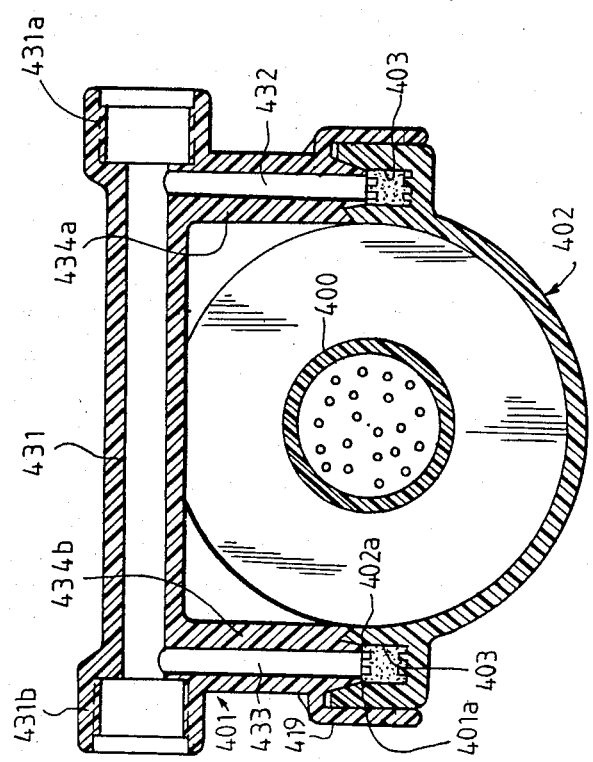
FIG. 13 is a sectional view of the two assembled half-shells, this view being taken along the plane XIII—XIII of FIG. 9.
Figure 17:
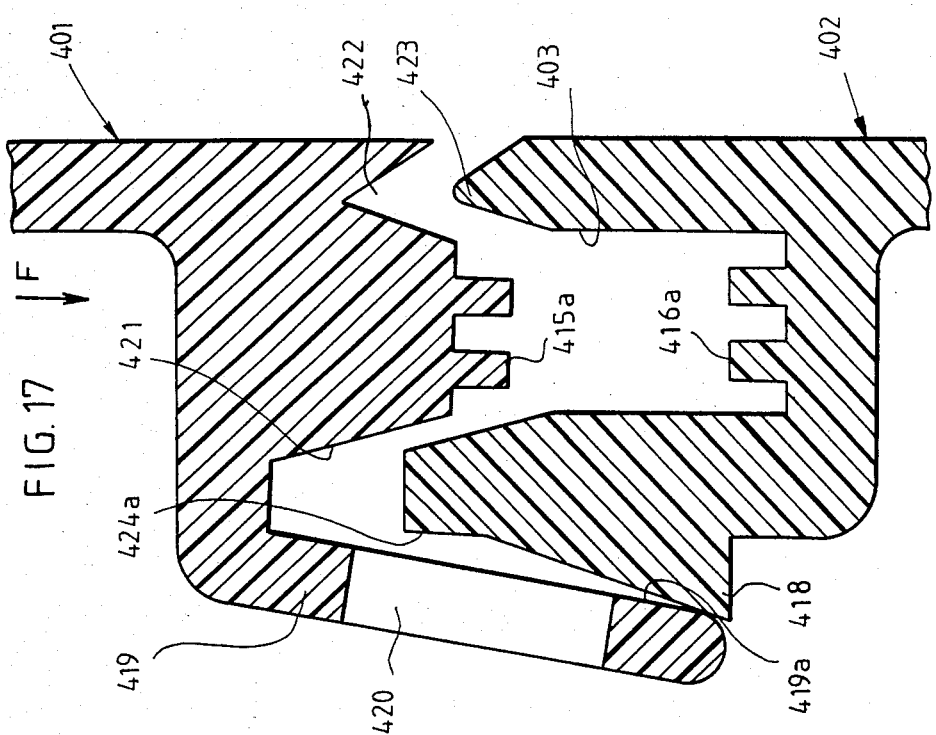
FIG. 17 is a view which is similar to FIG. 16 and showing the assembly of the adjacent flanges of the two half-shells.
Figure 16:
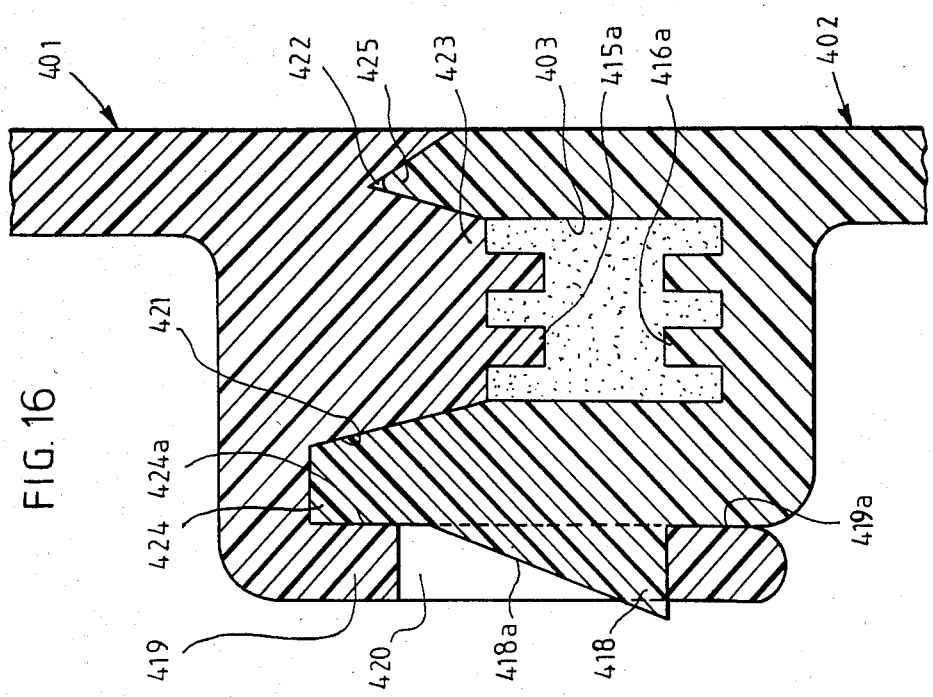
FIG. 16 is a view to a larger scale showing the detail XVI of FIG. 12.

In the embodiment of FIGS. 8 to 17, the sleeve for protecting the splice of a cable 400 comprises two half-shells 401, 402, the longitudinal flanges 401a, 402a of said half-shells being each provided with a channel which defines a duct 403 in the assembled position of the flanges. Said channel 403 is intended to be filled with material in paste form in order to achieve fluid-tightness between said flanges 401a, 402a (as shown in FIGS. 12, 13 and 16).

The cable 400 (as shown in FIGS. 9, 12 and 15) is secured axially to each end of the sleeve by means of clamping jaws each constituted by two jaw elements such as those designated by the references 404a, 404b and 405a, 405b. Said jaw elements are fitted in recesses such as those designated by the references 410a, 410b (see FIGS. 8 and 10), said recesses being formed in the half-shells 401, 402.

It is further apparent from FIGS. 8 and 10 that, when the jaws are fitted in position within the recesses 410a, 410b, a chamber 413 is defined between said jaws. Said chamber is intended to be filled with the sealing material which is injected into the duct 403 formed between the longitudinal edges of the half-shells 401, 402.

Said chamber 413 communicates with the duct 403 by means of a channel 414 (as shown in FIG. 10) formed near the jaw 404a, 404b (FIG. 12) which is adjacent to the chamber 413.

The jaws 404a, 404b and 405a, 405b (FIG. 15) and the method adopted for fitting them in the ends of the half-shells 401, 402 (FIG. 11) are similar to those described with reference to FIGS. 3 and 4.

In accordance with the present invention, the adjacent flanges 401a, 402a (FIG. 11) of the half-shells 401, 402 as well as the chamber 413 have raised portions separated by recessed portions which are intended to be filled with sealing material in paste form.

In the embodiment which is illustrated (see FIGS. 10, 12, 13 and 16), said raised portions are ribs 415a, 416a, 417 which are molded on said flanges 401a, 402a and on the internal surface of the chamber 413.

Moreover, as indicated in FIGS. 8, 11, 12, 13 and 16, the adjacent flanges 401a, 402a of the half-shells 401, 402 are provided with snap-action coupling means.

The coupling means just mentioned comprise a series of snap-action engagement noses 418 formed on the flange 402a of the half-shell 402. Said noses 418 project outwards from the half-shell in a direction (see FIG. 16) which is substantially parallel to the plane of assembly of the two half-shells 401, 402. The flange 401a of the other half-shell 401 has a flexible wall 419 which projects with respect to the plane of assembly in a direction substantially perpendicular to said plane. Said flexible wall 419 is provided with openings 420 for receiving the snap-action engagement noses 418.

Each snap-fastening nose 418 has a portion 418a forming an engagement ramp which makes it possible at the time of assembly of the two half-shells 401, 402 to produce progressive outward flexural deformation of the flexible wall 419 prior to snap-action engagement of the noses within the openings 420 of said wall.

FIG. 16 shows in addition that the flange 401a of the half-shell 401 which includes the flexible wall 419 has two parallel grooves 421, 422 separated by a protuberance 423, the apex of which carries the ribs 415a. The flange 402a of the other half-shell 402 comprises two parallel lips 424, 425 on each side of the channel 403 which is intended to receive the protuberance 423 of the other flange 401a. Said two parallel lips have cross-sections which are complementary to those of the grooves 421, 422 formed in the first flange 401a and are engaged in said grooves.

The internal face 419a of the flexible wall 419 is located in the line of extension of the external flank 424a of the adjacent groove 424.

Moreover, the chamber 413 (FIG. 8) to be filled with sealing resin and formed between the jaws which are fitted in the recesses 410a, 410b (FIG. 10) communicates with a cavity 426 (FIG. 14) forming a boss 427 on the external surface of the half-shell 401 (as also shown in FIG. 8). Said cavity 426 has sides 428 which converge towards the end portion 429 of said cavity. Said end portion 429 is fitted with a ball-valve 430 (FIG. 14).

In the embodiment which is illustrated, the means for injecting sealing material comprise (as shown in particular in FIG. 13) a tube 431 which extends externally and along the entire width of the half-shell 401 and which is integral with said half-shell. Said tube 431 is provided at both ends with openings or nozzles 431a, 431b and communicates via two ducts 432, 433 formed in the opposite side walls 434a, 434b of the half-shell 401 with the duct 403 provided between the coupling flanges 401a, 402a of said half-shell.

Either of the two end nozzles 431a, 431b of said tube 431 can be connected to a device for injecting under pressure, the other end nozzle of said tube being intended to be closed by a seal plug.

In the embodiment shown, each end of the half-shells 401, 402 is provided in its coupling flange 401a, 402a with two bores 435 (as shown in FIGS. 9 and 10) through which screws are intended to be passed for clamping the two half-shells together. Provision is made for two other bores 436 (also shown in FIG. 15) which are located near said two bores 435.

Each bottom end of the bores 436 formed in the flange 401a of the half-shell 401 is closed by means of a metal cup 436 which rests on the flange 402a of the other half-shell 402. Said cup 437 serves as a stop for a screw 438 which is intended to be screwed into each of the two bores 436 when it is desired to disassemble the two half-shells.

In order to assemble the sleeve which has just been described, the procedure to be adopted is as follows.

The jaw elements 404a, 404b; 405a, 405b, and so on, are first fitted in the recesses 410a, 410b and so on which are provided at the opposite ends of each half-shell 401, 402. The cable 400 and its splice is covered by the two half-shells 401, 402. The adjacent flanges 401a and 402a of the half-shells 401, 402 are then assembled together. To this end, it is only necessary to press the two flanges 401a, 402b together (as indicated by the arrow F in FIG. 17), for example by means of pliers specially designed for this purpose. During this operation, the flexible wall 419 of the half-shell 401 slides over the ramps 418a of the snap-engagement noses 418 and bends outwards. At the end of travel, the noses 418 engage by snap action within the openings 420 of the wall 419, the lips 424 and 425 of the flange 402a of the half-shell 402 engage within the grooves 421, 422 of the flange 401a of the half-shell 401 and the protuberance 423 of said half-shell engages within the channel 403 formed in the flange 402a of the other half-shell 402.

In the position of assembly as indicated in FIG. 16, the adjacent flanges 401a, 402a of the half-shells 401, 402 are securely locked together by virtue of the snap-fastening of the noses 418 within the openings 420 of the flexible wall 419.

Furthermore, any relative lateral sliding displacement of the flanges 401a, 402b after assembly is prevented by means of the triple engagement produced by the two lips 424, 425 and the protuberance 424 within complementary grooves or channel. Moreover, said triple engagement already ensures a certain degree of fluid-tightness between the flanges 401a and 402b, especially with respect to the sealing material which is injected into the internal channel 403.

Said sealing material can be injected into said channel 403 through the end nozzle 431a or 431b of the tube 431. During this injection, said sealing material fills the channel 403, then the chamber 413 formed at each end of the sleeve between two jaws for retaining the cable 400.

The microbubbles formed within the sealing material at the time of polymerization accumulate near the end portion 429 of the cavity 426 which is arranged above the chamber 413. By virtue of said cavity 426, said microbubbles are not liable to form within the channel 403 or within the chamber 413 and thus to impair the fluid-tightness within these latter.

By virtue of the ribs 415a and 416a which project into the interior of the channel 403 and the ribs formed on the internal surface of the chamber 413, the adhesion of the sealing material is considerably improved. This excellent adhesion permits enhanced fluid-tightness between the adjacent flanges of the half-shells and within the interior of the chamber 413. Such highly efficient adhesion of the sealing material also results in higher mechanical strength of assembly between the adjacent flanges of the two half-shells.

Thus the assembly formed by the interengaged flanges 401, 402 of the half-shells is not liable to be torn apart under the action of the overpressure of air which is developed within the sleeve.

It should also be noted that the resultant increase in strength of the assembly makes it possible to replace or reduce the number of clamping screws employed up to the present time, this being achieved by the snap-action engagement means which have been described in the foregoing and which considerably facilitate the assembly of the sleeve.

It will readily be understood that the invention is not limited to the examples which have just been described and for which a large number of modifications may be contemplated without thereby departing from the scope of the invention.

From this it accordingly follows that the ribs 415a can be replaced by other continuous or non-continuous raised portions for increasing the surface area of adhesion of the sealing material.

Figure 20:
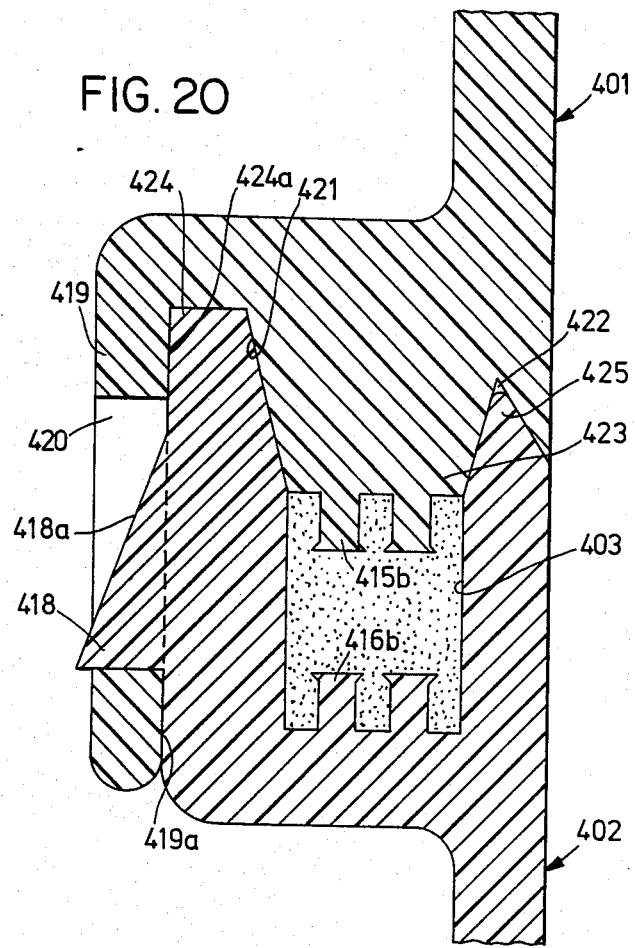
FIG. 20 is a view similar to FIG. 16 but showing a modified form of the invention.

It is also possible to increase the adhesion of said sealing material to an even greater extent by widening the free ends of the ribs by means of ultrasonic radiation, by partial melting of the plastic material or a similar method, as shown at 415b, 416b, in FIG. 20.

Figure 19:
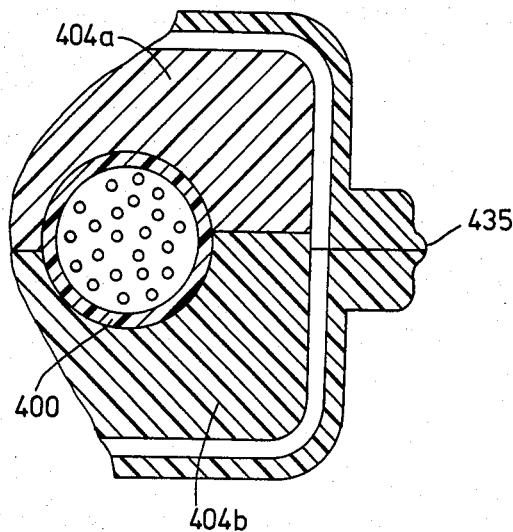
FIG. 19 is a view similar to a portion of FIG. 12 but showing a modified form of the invention.

Furthermore, the snap-action coupling means described in the foregoing could be formed on only two adjacent flanges of the half-shells, in which case the other two flanges could be joined together by a strip of plastic material which is molded in one piece with the two half-shells and forms a hinge-type flexible joint between these latter, as shown at 435 in FIG. 19.

Thus the two half-shells could be molded at the same time in a single mold having two molding cavities placed side by side and connected together by means of the above-mentioned hinge-joint strip 435.

It will readily be apparent that, in the case of sleeves having substantial dimensions for one or a number of cables of large cross-sectional area, the two half-shells would again be assembled together by making use of clamping screws and not snap-fastening means. In this case, the ribs 415a and 416a which serve to improve the mechanical coupling between the half-shells make it possible to reduce the number of clamping screws and consequently to reduce the time taken to assemble the sleeve.

Another point worthy of note is that, instead of making use of sealing material which is injected in the liquid state into the channel 403 and into the chamber 413, it would be possible to use paste which is placed directly in the form of long cylindrical strips 430 within the peripheral channel of a half-shell 402, in the form of curved cylindrical strips 433 within the channel 434 which connects the channel 403 to the chamber 413 and in the form of blocks 431, 432 within the end chamber 413 (as shown in FIG. 18). At the time of assembly of the half-shells, said paste-type cylindrical strips and blocks undergo deformation and follow the internal profile of the channels and of the chambers, thus producing within these latter a degree of fluid-tightness which is comparable with that obtained by injection of sealing material in the liquid state.

Finally, snap-action coupling means could be arranged on the portions 422, 425 (as shown in FIG. 16), thereby improving the effectiveness of assembly of the two half-shells 401, 402 if so required.

What is claimed is:

1. A sleeve for protecting cable splices, comprising two half-shells having longitudinal flanges, said half-shells being adapted to be assembled together around a splice by means of said flanges, a channel in said flanges defining a duct in the assembled position, means for introducing material in paste form into said duct so as to ensure fluid-tightness between said flanges, the opposite ends of the sleeve having jaws adapted to be clamped against the cable at the time of assembly of the two half-shells, a chamber which communicates with said duct, said chamber being defined between at least two of said jaws, said chamber communicating with said duct by means of a channel formed around the entire periphery of a said jaw which is adjacent to said chamber, said channel being formed at the bottom of a recess in said half-shells in which said jaw is fitted.

2. A sleeve according to claim 1, wherein the channel communicates with the duct defined between the adjacent flanges of the half-shells via two passages which are transverse to said duct one at each end of said duct, said passages being formed in the flanges of the half-shells.

3. A sleeve according to claim 1 in which each jaw is constituted by two jaw elements adapted to be engaged in interfitting relation around a cable, each said jaw element being provided with a series of grooves extending in concentric circular arcs adapted to different cable diameters, wherein the flange of one of the jaw elements which is intended to be engaged in the adjacent flange of the other jaw element comprises two rectilinear portions of equal length which are provided in one case with a convex profile and in the other case with a concave profile and which are intended to receive respectively the concave profile and the convex profile of the corresponding portions of the flange of the other jaw element.

4. A sleeve according to claim 3, wherein the convex profile is defined by an outwardly projecting dihedron of the jaw element and the concave profile is defined by a complementary inwardly projecting dihedron.

5. A sleeve according to claim 4, wherein the adjacent edges of the jaw elements are sealed to each other.

6. A sleeve according to claim 5, wherein the edges of the jaw elements are provided with transverse notches separated by projecting lugs having the same width as said notches, the opposite edges of said notches being located in the line of extension of two arcuate grooves separated by one or a number of other grooves.

7. A sleeve according to claim 6, wherein the partition-walls which define the bottom ends of the grooves are located at a distance from the opposite faces of the jaw elements which is successively short and long with respect to one of said faces.

8. A sleeve according to claim 7 for protecting cable splices, comprising two half-shells adapted to be assembled together around a cable splice by means of said flanges, at least the flange of one half-shell being provided with a channel which defines a duct in the position of assembly with the adjacent flange of the other half-shell, means being provided for injecting paste material into said duct in order to establish fluid-tighteness between said adjacent flanges, the opposite ends of the sleeve being provided with jaws which are intended to be clamped against a cable at the time of assembly of the two half-shells, there being defined between at least two of said jaws a chamber at each end of said sleeve which communicates with said duct and which is intended to be filled with sealing material, wherein the adjacent flanges of the half-shells as well as the chamber are provided with raised portions separated by recessed portions which are intended to be filled with said paste-type sealing material.

9. A sleeve according to claim 8, wherein said raised portions are ribs molded on said flanges and on the internal surface of said chamber.

10. A sleeve according to claim 8, wherein said flanges of the half-shells comprise snap-action coupling means.

11. A sleeve according to claim 10, wherein said means comprise on a said flange of one of the half-shells a series of snap-fastening noses which project outwards from the half-shell in a direction substantially parallel to the plane of assembly of said two half-shells, and wherein said means comprise on the adjacent said flange of the other half-shell a flexible wall which projects with respect to the plane of assembly in a direction substantially perpendicular to said plane, said flexible wall being provided with openings for receiving said snap-fastening noses.

12. A sleeve according to claim 11, wherein each snap-fastening nose has a portion forming an engagement ramp which makes it possible at the time of assembly of the two half-shells to produce progressive outward flexural deformation of the flexible wall prior to snap-action engagement of said noses within the openings of said wall.

13. A sleeve according to claim 12, wherein the flange of the half-shell which is provided with the flexible wall has two parallel grooves separated by a protuberance whose apex carries the ribs aforesaid and wherein the flange of the other half-shell is provided on each side of the channel for receiving the protuberance of the other flange with two parallel lips having cross-sections which are complementary to those of the grooves formed in the first flange, said lips being intended to penetrate into said grooves.

14. A sleeve according to claim 13, wherein the internal face of the flexible wall is located in the line of extension of the external flank of the adjacent groove.

15. A sleeve according to claim 14, wherein the snap-action coupling means are arranged on two adjacent flanges of the half-shells and wherein the other two flanges are joined together by a strip of plastic material which is molded in one piece with the two half-shells and forms a hinge-type flexible joint between said half-shells.

16. A sleeve according to claim 15, wherein the chamber formed between two jaws and intended to be filled with sealing material communicates with a cavity forming a boss on the external surface of one of the half-shells.

17. A sleeve according to claim 16, wherein said cavity has sides which converge towards the end portion of said cavity, said end portion being fitted with a ball-valve.

18. A sleeve according to claim 17, wherein the means for injecting sealing material comprise a tube which extends externally and along the entire width of one half-shell and is integral with said half-shell, said tube being open at both ends and adapted to communicate via two ducts formed in the opposite lateral walls of the half-shell with the duct provided between the coupling flanges of the half-shells, one end of said tube being intended to be connected to a device for injecting under pressure and the other end of said tube being intended to be closed by a seal plug.

19. A sleeve according to claim 18, wherein the free end of each rib has a portion which is widened by means of ultrasonic radiation or the like.

* * * * *